United States Patent
Itoigawa et al.

(10) Patent No.: US 9,716,455 B2
(45) Date of Patent: Jul. 25, 2017

(54) POWER CONVERSION DEVICE AND METHOD OF CONTROLLING THE SAME

(71) Applicant: FUJI ELECTRIC CO., LTD., Kawasaki-shi (JP)

(72) Inventors: Nobuo Itoigawa, Suzuka (JP); Takao Ichihara, Tsu (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/680,656

(22) Filed: Apr. 7, 2015

(65) Prior Publication Data

US 2015/0214876 A1    Jul. 30, 2015

Related U.S. Application Data

(63) Continuation of application No. PCT/JP2014/060049, filed on Apr. 7, 2014.

(30) Foreign Application Priority Data

Apr. 22, 2013 (JP) .................................. 2013-089138

(51) Int. Cl.
*H02P 6/14* (2016.01)
*H02P 6/18* (2016.01)
(Continued)

(52) U.S. Cl.
CPC .............. *H02P 6/20* (2013.01); *H02P 1/029* (2013.01); *H02P 6/182* (2013.01); *H02P 9/08* (2013.01); *H02P 21/18* (2016.02); *H02P 21/22* (2016.02); *H02P 6/16* (2013.01)

(58) Field of Classification Search
CPC ............... H02P 6/20; H02P 6/182; H02P 9/08
See application file for complete search history.

(56) References Cited

U.S. PATENT DOCUMENTS 6,075,328 A * 6/2000 Notohara .............. H02M 5/458
                                                              318/400.01
7,501,787 B2   3/2009 Tajima et al.
(Continued)

FOREIGN PATENT DOCUMENTS

CN           1976213 A      6/2007
EP           1138539 A2    10/2001
(Continued)

*Primary Examiner* — Bentsu Ro
*Assistant Examiner* — Zemenay Truneh
(74) *Attorney, Agent, or Firm* — Rabin & Berdo, P.C.

(57) ABSTRACT

A power conversion device includes an inverter which can convert between DC and AC power by turning on and off bridge-connected semiconductor switching elements with free wheel diodes connected in reverse parallel; and a rotating electric machine, such as an AC generator or motor, which is connected to the AC terminals of the inverter, where when the DC voltage of the inverter is below a specified value when starting the machine, the speed of the machine is detected in a condition where the DC voltage of the inverter is boosted to at least a specified value of the induced voltage of the machine, by intermittently turning on and off at least one of the switching elements, so as to accurately detect the speed of the machine and stably start it even when the DC voltage of the inverter is lower than the induced voltage of the machine.

14 Claims, 7 Drawing Sheets

(51) Int. Cl.

| | | |
|---|---|---|
| *H02P 6/20* | (2016.01) | |
| *H02P 6/182* | (2016.01) | |
| *H02P 9/08* | (2006.01) | |
| *H02P 1/02* | (2006.01) | |
| *H02P 21/22* | (2016.01) | |
| *H02P 21/18* | (2016.01) | |
| *H02P 6/16* | (2016.01) | |

(56) References Cited

U.S. PATENT DOCUMENTS

| | | | | |
|---|---|---|---|---|
| 2001/0026141 | A1* | 10/2001 | Hirata | B60K 6/485 |
| | | | | 318/727 |
| 2007/0145919 | A1* | 6/2007 | Hamaoka | H02P 6/16 |
| | | | | 318/400.34 |
| 2007/0145939 | A1 | 6/2007 | Tajima et al. | |
| 2009/0237020 | A1 | 9/2009 | Sakai | |
| 2013/0257330 | A1* | 10/2013 | Yoshida | H02P 1/04 |
| | | | | 318/430 |
| 2014/0184129 | A1* | 7/2014 | Oka | H02P 5/74 |
| | | | | 318/600 |

FOREIGN PATENT DOCUMENTS

| | | | | |
|---|---|---|---|---|
| JP | 11-075394 | | 3/1999 | |
| JP | 11075394 | A * | 3/1999 | B60K 1/02 |
| JP | 2005-184947 | A | 7/2005 | |
| JP | 2007-017026 | A | 1/2007 | |
| JP | 2007-159231 | A | 6/2007 | |
| JP | 2010-142112 | A | 6/2010 | |
| WO | WO 2012-159843 | A2 | 11/2012 | |

* cited by examiner

POWER CONVERSION DEVICE AND METHOD OF CONTROLLING THE SAME

CROSS-REFERENCE TO RELATED APPLICATIONS

This application is a continuation of International Patent Application serial number PCT/JP2014/060049, filed on Apr. 7, 2014 and published on Oct. 30, 2014 as WO 2014/175046 A1, which in turn claims priority from Japanese Patent Application serial number 2013-089138, filed on Apr. 22, 2013, both of which are hereby incorporated by reference.

FIELD OF THE INVENTION

The present invention relates to a power conversion device which enables a stable start of a rotating electric machine, such as an alternating current motor or an alternating current generator, and to a method of controlling the power conversion device.

BACKGROUND ART

As a power conversion device which drives a permanent magnet synchronous motor (PMSM) acting as a rotating electric machine, one described in JP-A-11-75394 (Paragraphs [0011] and and FIG. 1 or the like) is known.

Figure 5:
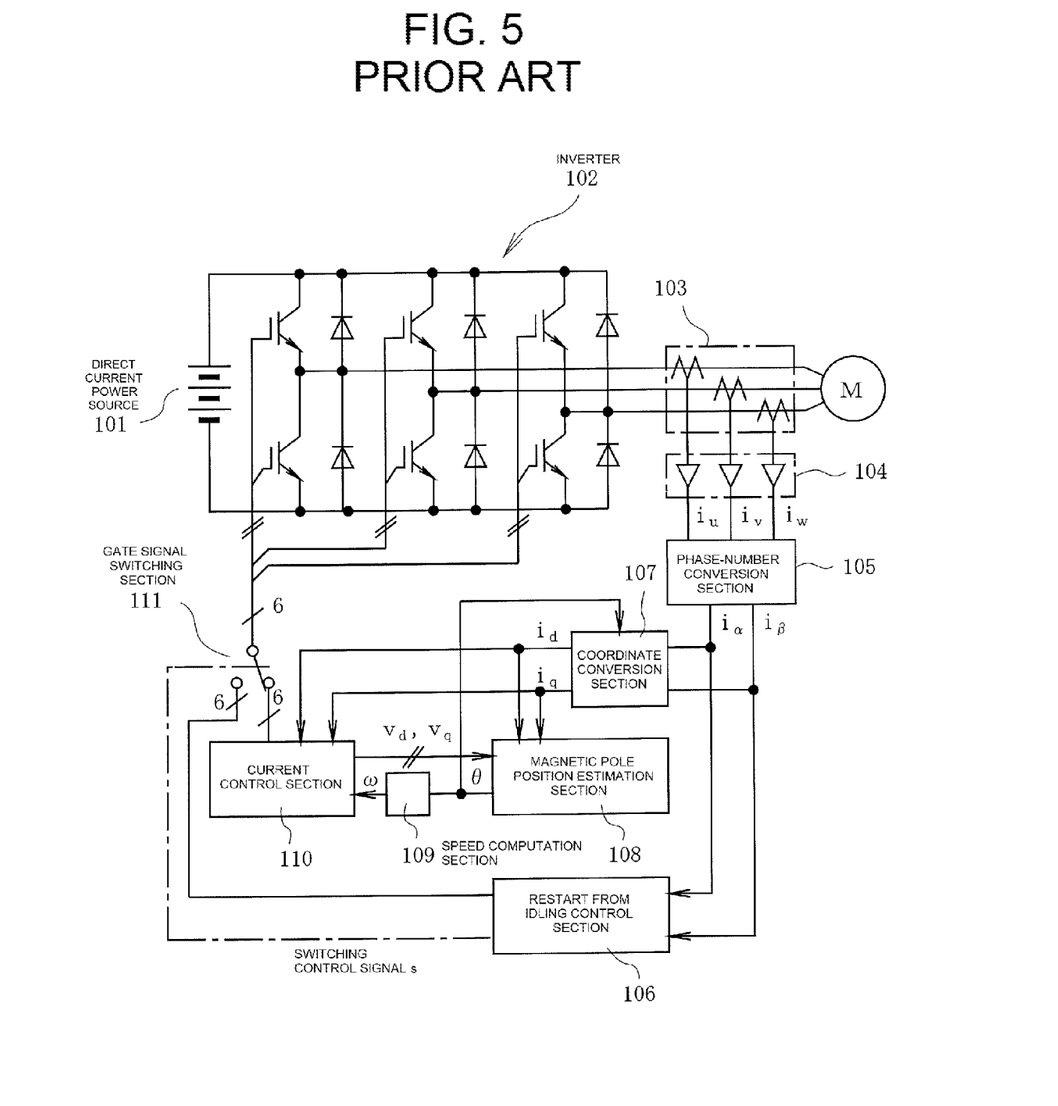
FIG. 5 is an overall configuration diagram of a heretofore known technology described in JP-A-11-75394.

FIG. 5 is a diagram showing a heretofore known technology described in JP-A-11-75394. In FIG. 5, 101 is a direct current power source, 102 is a three-phase voltage source inverter formed of semiconductor switching elements and free wheel diodes, M is a permanent magnet synchronous motor, 103 is a current detector, 104 is a current detector gain, 105 is a phase-number conversion section, 106 is a restart from idling control section, 107 is a coordinate conversion section, 108 is a magnetic pole position estimation section, 109 is a speed computation section, 110 is a current control section, and 111 is a gate signal switching section.

A so-called position and speed senseless power conversion device shown in FIG. 5 enables a smooth restart of the inverter 102 in a kind of case in which a rotor is running idle, and an induced voltage is generated in the stator winding of the synchronous motor M, in a condition in which the inverter 102 is stopped and no voltage is applied to the synchronous motor M.

That is, in FIG. 5, the restart from idling control section 106 detects a condition, in which the inverter 102 is stopped and the current of the synchronous motor M is zero, from two phase components $i_\alpha$ and $i_\beta$ of a winding current output from the phase-number conversion section 105. When the restart from idling control section 106 generates a kind of gate signal which turns on at least one of the semiconductor switching elements of the inverter 102, and switches the gate signal switching section 111 to the restart from idling control section 106 side using a switching control signal s, the one switching element is turned on, and at least one phase of the stator winding of the synchronous motor M is short-circuited. In the event that the rotor is running idle at this time, a short circuit current flows through the stator winding, via the switching element turned on and a free wheel diode of another phase, due to the induced voltage of the stator winding, and a period of conduction of the short circuit current depends on a magnetic pole position and a rotating speed, meaning that it is possible to estimate the magnetic pole position and rotating speed based on the short circuit current.

As heretofore described, when the winding current is zero and the rotor is running idle, the restart from idling control section 106 operates so as to short-circuit the stator winding of the synchronous motor M and cause the short circuit current due to the induced voltage to flow. Further, the magnetic pole position estimation section 108 and the speed computation section 109 compute a magnetic pole position θ and a rotating speed ω from the short circuit current at this time, and the current control section 110 generates an initial value of a current command or the like, and controls the inverter 102, thereby executing a restart of the device.

There is a case in which the direct current voltage of the inverter 102 is insufficient when an anomaly occurs in, for example, the direct current power source 101 in this kind of power conversion device, and after that, the power conversion device is restarted, or when the commercial power source is interrupted by a stroke of lightning or the like (including an instantaneous power interruption) in a system including a rectifier power source, into which a commercial power source and a rectifier circuit are combined, in place of the direct current power source 101, and after that, the system is restarted.

In this case, it is conceivable to compensate for the lack of voltage using a separately provided standby power supply device such as an auxiliary power supply or a battery, but the whole of a control system including the standby power supply device increases in size, thus requiring a large installation space, and moreover, leading to an increasing price.

Meanwhile, JP-A-2007-17026 (Paragraphs [0024] to [0028] and FIG. 2 or the like) describes a heretofore known technology wherein a first power converter, which rectifies a commercial power source voltage and converts the rectified voltage to a direct current voltage, and a second power converter, which drives a synchronous motor with a gas engine, thus causing the synchronous motor to operate as a generator, and converts a voltage output therefrom to a direct current voltage, are connected to a common direct current bus bar, and the direct current voltage of a direct current intermediate circuit is converted to an alternating current voltage by a third power converter, and supplied to an auxiliary machine, such as a motor.

Figure 6:
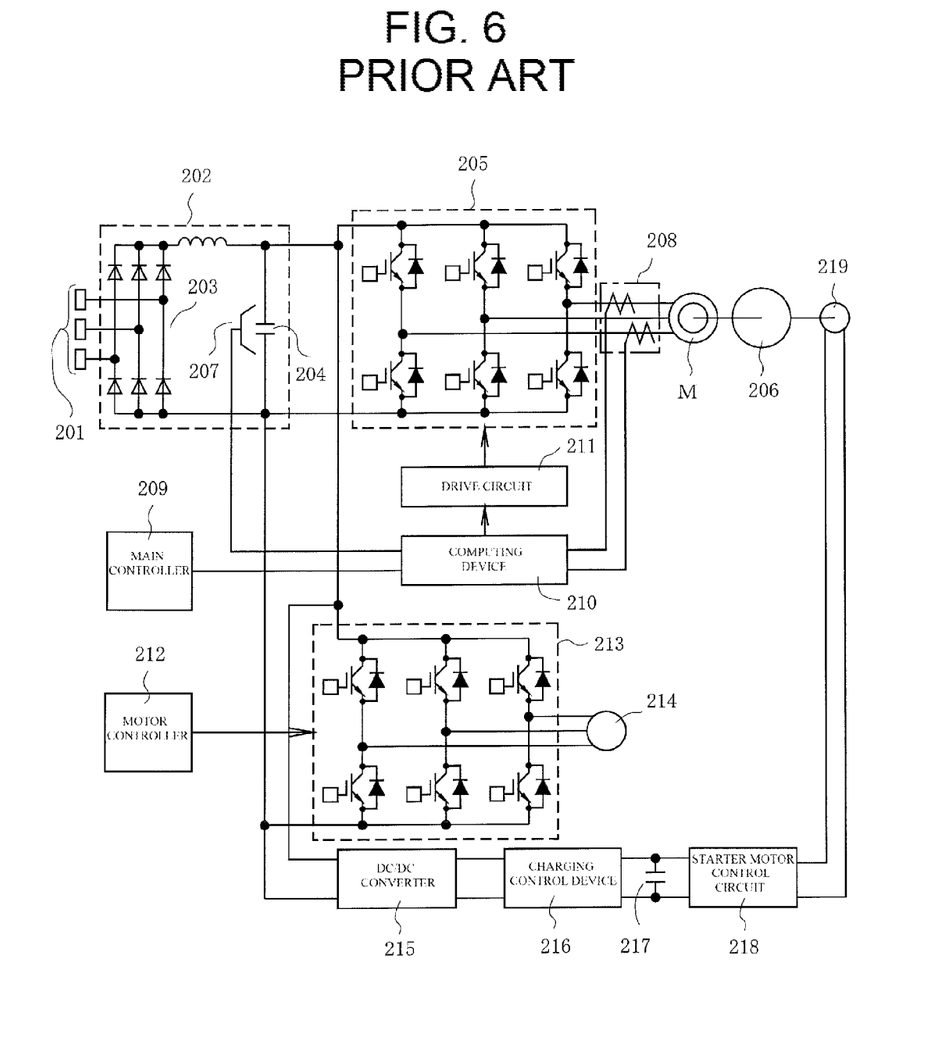
FIG. 6 is an overall configuration diagram of a heretofore known technology described in JP-A-2007-17026.

FIG. 6 is a diagram showing the heretofore known technology described in JP-A-2007-17026.

In FIG. 6, 201 is a commercial power source, 202 is a first power converter having a diode rectifier circuit 203, an electrolytic capacitor 204, and the like, 205 is a second power converter (a PWM converter) to the alternating current terminals of which a synchronous motor M is connected and which shares a direct current bus bar with the first power converter 202, 206 is a gas engine which drives the synchronous motor M, 207 is a voltage detector, and 208 is a current detector. Also, 209 is a main controller, 210 is a computing device, 211 is a drive circuit, 212 is a motor controller, 213 is a third power converter (an inverter) connected in parallel to the first and second power converters 202 and 205, 214 is an auxiliary machine, such as a motor, which is driven by the power converter 213, 215 is a DC/DC converter, 216 is a charging control device, 217 is an electrical storage device, 218 is a starter motor control circuit, and 219 is a starter motor for the gas engine 206.

In the heretofore known technology of FIG. 6, in the event that the gas engine 206 is caused to operate at high speed, and power generated by the synchronous motor M is equal to or more than a predetermined value, the generated power is converted to direct current power by the power converter 205, supplied to the power converter 213, and converted to an alternating current voltage, thus driving the auxiliary machine 214. Also, a surplus of the direct current power is input into the DC/DC converter 215, and converted to a predetermined level of direct current voltage, with which the electrical storage device 217 is charged by the charging control device 216. The power of the electrical storage device 217 is used to drive the starter motor 219 via the starter motor control circuit 218.

Furthermore, when power generation is inefficient as when causing the gas engine 206 to operate at low speed, and power generated by the synchronous motor M is small, no power generation control is carried out, and direct current power obtained by rectifying the commercial power source 201 with the first power converter 202 is supplied to the power converter 213 and DC/DC converter 215, thus carrying out a drive of the auxiliary machine 214 and a charging of the electrical storage device 217.

According to the heretofore known technology of FIG. 6, the heretofore described operation enables an efficient operation of the auxiliary machine 214 in accordance with an operation condition of the gas engine 206.

In the heretofore known technology shown in FIG. 6, when the power generated by the synchronous motor M is equal to or more than the predetermined value, it is possible to supply power to the auxiliary machine 214 even in the event that the commercial power source 201 is interrupted, but in this case, there is the following kind of problem.

Firstly, the rotating speed of the synchronous motor M (that is, the rotating speed of the gas engine 206) in FIG. 6 can be detected by the same principle as in JP-A-11-75394. That is, when a lower-arm switching element of one phase of the power converter 205 is turned on, and in the event that an induced voltage (which shall be synonymous with a terminal voltage by ignoring internal resistance) of the synchronous motor M in the one phase is higher than in any other phase, a short circuit current flows via a lower-arm free wheel diode of a phase with a low induced voltage. As a period in which the short circuit current flows is a period of an electrical angel of 120 degrees wherein the induced voltage in the phase, the switching element of which is turned on, is higher than in any other phase, it is possible to detect the rotating speed based on a time for which the short circuit current flows or does not flow.

However, in a condition in which a direct current intermediate voltage (a voltage across the electrolytic capacitor 204) is insufficient due to an interruption of the commercial power source 201, or the like, and the induced voltage of the synchronous motor M is higher than the direct current intermediate voltage, the short circuit current of a stator winding flows via the free wheel diodes in the power converter 205 and the electrolytic capacitor 204 in the direct current intermediate circuit even though no switching element of the power converter 205 is turned on.

That is, when the induced voltage is higher than the direct current intermediate voltage of the power converter 205, the short circuit current flows uncontrollably at an unexpected timing, meaning that the short circuit current cannot be distinguished from a short circuit current caused to flow by intentionally turning on a switching element when detecting the speed. Therefore, there has been the problem that it is difficult to accurately detect the rotating speed of the synchronous motor M, or it is not possible to detect the rotating speed, the problem of a failure in starting due to a false detection of the speed, the problem that it is not possible to stably start the synchronous motor M, or the like.

Therefore, a problem to be solved by the invention is to provide a power conversion device wherein it is possible to accurately detect the speed of a rotating electric machine and stably start the rotating electric machine even when the direct current voltage of a power conversion section, such as an inverter section, is lower than the induced voltage of the rotating electric machine, and a method of controlling the power conversion device.

SUMMARY OF THE INVENTION

In order to solve the problem, a power conversion device according to the invention is directed to a power conversion device including a power conversion section which can alternately convert between direct current power and alternating current power by turning on and off a plurality of bridge-connected semiconductor switching elements to each of which a free wheel diode is connected in reverse parallel; and a rotating electric machine, such as an alternating current generator or an alternating current motor, which is connected to the alternating current terminals of the power conversion section.

Further, according to an aspect of the power conversion device when the direct current voltage of the power conversion section is below a specified value when starting the rotating electric machine, an operation of detecting the speed of the rotating electric machine is executed in a condition in which the direct current voltage of the power conversion section is boosted to equal to or more than the specified value by intermittently turning on and off at least one of the plurality of semiconductor switching elements of the power conversion section.

Also, according to another aspect of the power conversion device, when the rotating electric machine is an alternating current generator and the direct current voltage of the power conversion section is lower than an induced voltage of the alternating current generator driven by a drive source, an operation of detecting the speed of the alternating current generator is executed in a condition in which the direct current voltage of the power conversion section is boosted to equal to or higher than the induced voltage by intermittently turning on and off at least one of the plurality of semiconductor switching elements of the power conversion section.

According to yet another aspect of the power conversion device, when the rotating electric machine is an alternating current motor and the direct current voltage of the power conversion section is lower than the induced voltage of the alternating current motor, an operation of detecting the speed of the alternating current motor is executed in a condition in which the direct current voltage of the power conversion section is boosted to equal to or higher than the induced voltage by intermittently turning on and off at least one of the plurality of semiconductor switching elements of the power conversion section.

According to a further aspect of the power conversion device a commercial power source is provided; and a converter section which converts the alternating current power of the commercial power source to direct current power, wherein the positive and negative output terminals of the converter section are connected one to each end of a capacitor connected between the direct current terminals of the power conversion section.

According to a yet another aspect of the power conversion device, power supply terminals are connected one to each end of the capacitor, thus supplying a power source to an external load from the power supply terminals.

In yet another aspect of the power conversion device, a capacitor is connected between the direct current terminals of the power conversion section, and power supply terminals are connected one to each end of the capacitor, thus supplying a power source to an external load from the power supply terminals.

In a further aspect of the power conversion device control method, relating to a method of controlling the power conversion device, an operation of boosting the direct current voltage of the power conversion section to equal to or more than the specified value is carried out by simultaneously and intermittently turning on and off all semiconductor switching elements, of the plurality of semiconductor switching elements configuring the power conversion section, which configure the upper arms or lower arms of the power conversion section.

In a further aspect of the power conversion device control method, relating to a method of controlling the power conversion device the speed detection operation of the rotating electric machine is an operation of, when at least one of the plurality of semiconductor switching elements of the power conversion section is turned on, detecting the rotating speed of the rotating electric machine based on a period of conduction of a short circuit current flowing back through the one switching element and the stator winding of the rotating electric machine.

Advantageous Effects of Invention

According to the invention, when starting a rotating electric machine in a condition in which the direct current voltage of a power conversion section, such as an inverter section, is lower than the induced voltage of the rotating electric machine, and the direct current voltage is insufficient, the direct current voltage is boosted by a switching operation of the power conversion section, thereby enabling the subsequent speed detection operation, and it is thus possible to stably start the rotating electric machine. Also, as there is no more need for a standby power supply device, such as an auxiliary power supply or a battery, it is possible to reduce the size and price of the whole of the device.

DETAILED DESCRIPTION OF THE INVENTION

Hereafter, a description will be given, along with drawings, of a preferred embodiment of the invention.

Figure 1:
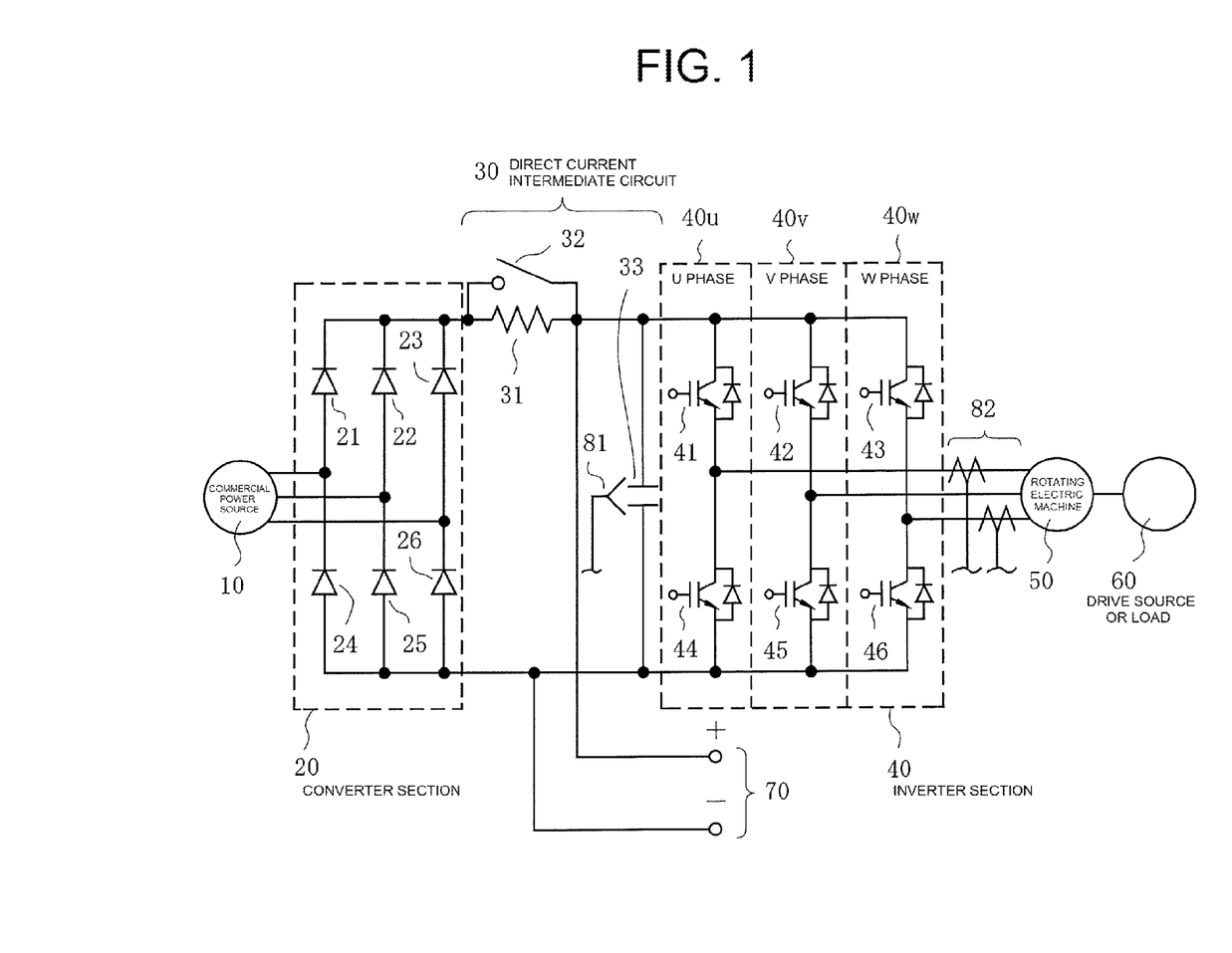
FIG. 1 is a configuration diagram of a power conversion device according to a preferred embodiment of the invention.

FIG. 1 is a configuration diagram of a power conversion device according to the preferred embodiment of the invention. In FIG. 1, 10 is a three-phase commercial power source, and the commercial power source 10 is connected to the alternating current input terminals of a converter section 20 acting as a bridge rectifier circuit formed of diodes 21 to 26. Also, a charging resistor 31 and a capacitor 33 are connected in series between the direct current output terminals of the converter section 20. Furthermore, the two ends of the charging resistor 31 can be short-circuited by a switch 32. Herein, the charging resistor 31, switch 32, and capacitor 33 configure a direct current intermediate circuit 30.

Power supply terminals 70 are connected one to each end of the capacitor 33, and the power supply terminals 70 are for supplying direct current power source to an external load (not shown) as necessary.

The direct current terminals of an inverter section 40 formed of bridge-connected semiconductor switching elements 41 to 46, to each of which a free wheel diode is connected in reverse parallel, are connected one to each end of the capacitor 33. In the inverter section 40, 40u is a U-phase arm formed of the switching elements 41 and 44, 40v is a V-phase arm formed of the switching elements 42 and 45, and 40w is a W-phase arm formed of the switching elements 43 and 46.

A rotating electric machine 50 is connected to the alternating current terminals of the individual phase arms 40u, 40v, and 40w, and a drive source or load 60 is linked to the rotor of the rotating electric machine 50. The rotating electric machine 50 is an alternating current generator or alternating current motor, such as a permanent magnet synchronous motor (generator), and the drive source or load 60 is a drive source, such as an engine, or a rotating load driven by the rotating electric machine 50. Hereafter, a description will be given of a case in which the permanent magnet synchronous motor acting as the rotating electric machine 50 is caused to operate as a generator by the drive source 60 such as an engine.

81 is a voltage detector which detects a direct current intermediate voltage (the voltage of the capacitor 33), and 82 is a current detector which detects the current of the stator winding of the rotating electric machine 50.

Figure 2:
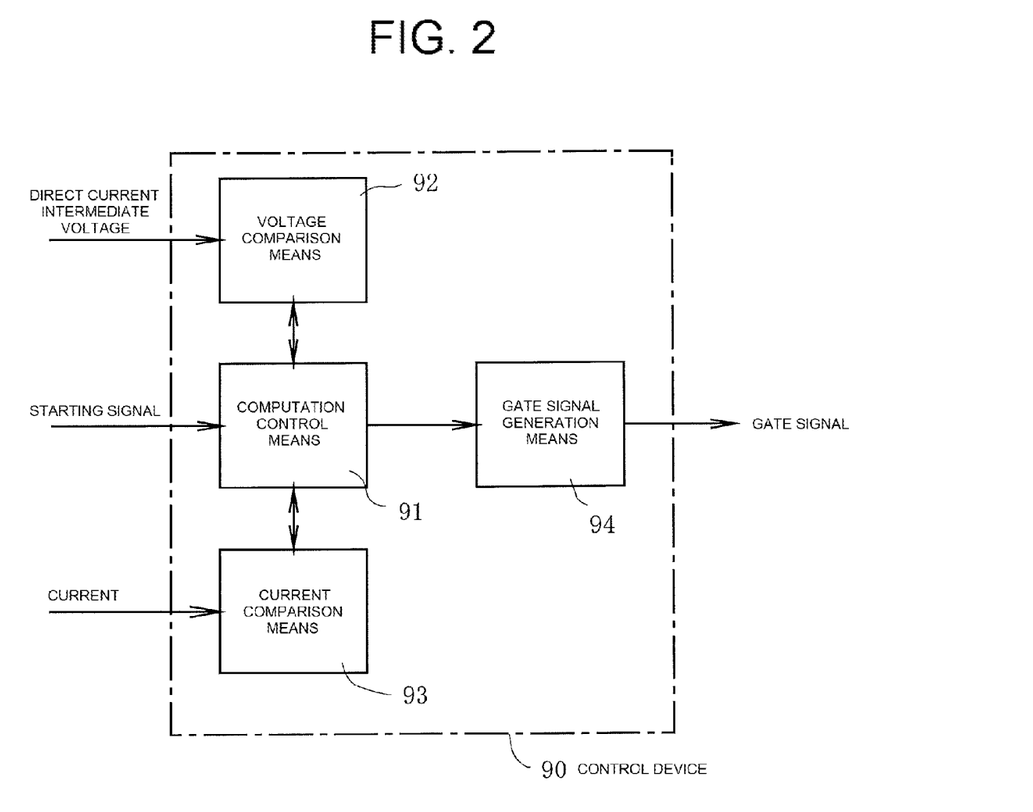
FIG. 2 is a function block diagram of a control device of an inverter section in FIG. 1.

FIG. 2 is a function block diagram of a control device of the inverter section 40 in FIG. 1.

The control device 90 includes voltage comparison means which compares the direct current intermediate voltage detected by the voltage detector 81 with a specified value, current comparison means 93 which compares the current detected by the current detector 82 with a specified value, computation control means 91 which executes a speed detection process, or the like, based on results of the comparisons by the voltage comparison means 92 and current comparison means 93 and on a time measured by a timer, and gate signal generation means 94 which generates a gate signal for a predetermined switching element of the inverter section 40 in accordance with a result of computation by the computation control means 91.

Next, a description will be given, along the flow chart of FIG. 3, of an operation when starting the rotating electric machine 50 in the preferred embodiment. Firstly, in order to prevent an inrush current when starting, the switch 32 in FIG. 1 is turned off, and the charging resistor 31 is inserted into the direct current intermediate circuit 30, thus charging the capacitor 33 with the output voltage of the converter section 20. Meanwhile, the rotating electric machine 50 is driven by the drive source 60, thus generating an induced voltage between the terminals of the rotating electric machine 50.

Figure 3:
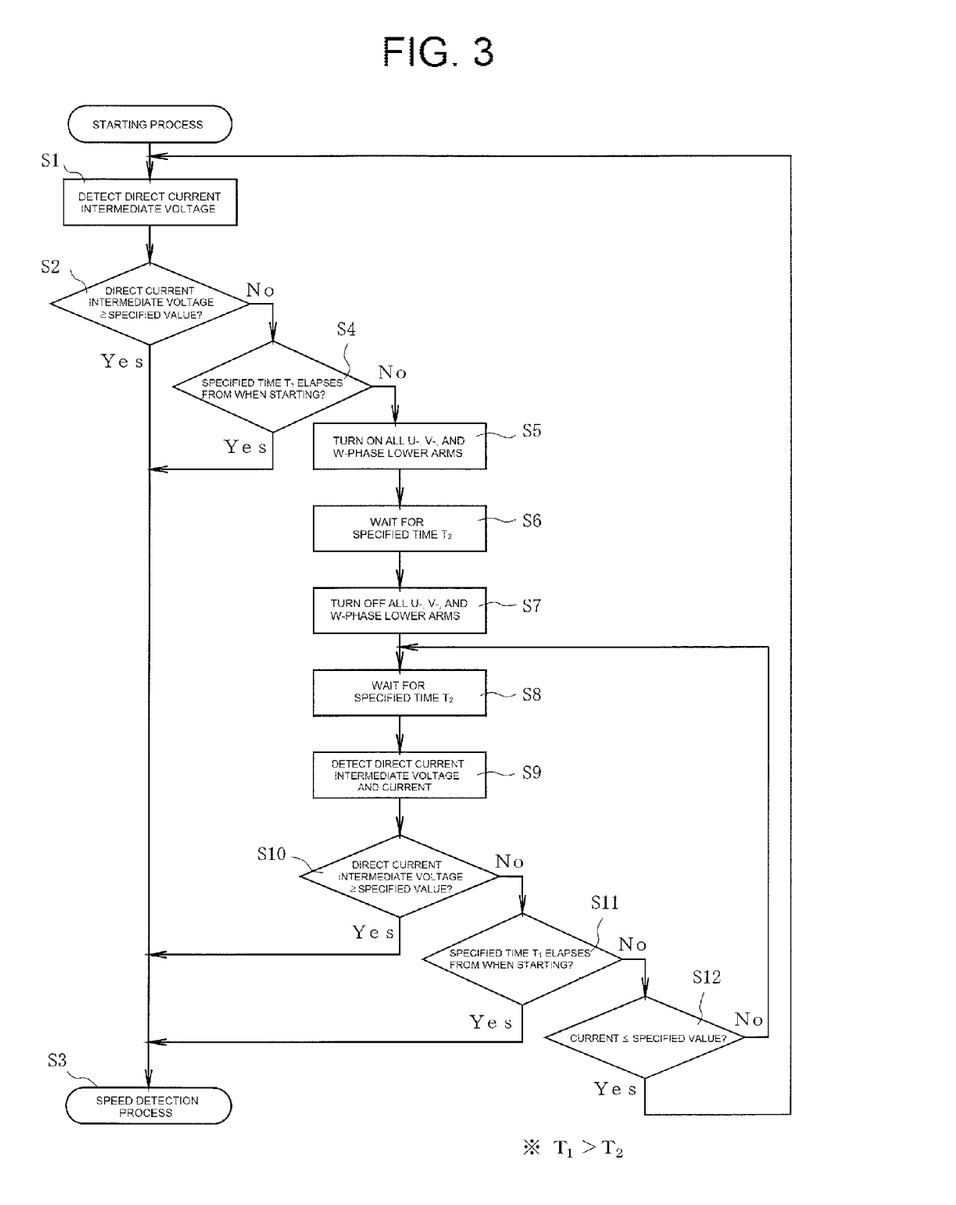
FIG. 3 is a flow chart showing an operation of the preferred embodiment of the invention.

As shown in FIG. 3, when starting, a direct current intermediate voltage is detected by the voltage detector 81 (step S1), and the detected direct current intermediate voltage is compared with the specified value by the voltage comparison means (step S2). Herein, the specified value is set to a value greater than the induced voltage of the rotating electric machine 50.

When the direct current intermediate voltage is equal to or more than the specified value (step S2 Yes), no reflux current (no short circuit current of the stator winding of the rotating electric machine 50) passing through the free wheel diodes in the inverter section 40 and the capacitor 33 flows due to the induced voltage of the rotating electric machine 50. Consequently, the computation control means 91 executes the speed detection process (step S3) and detects the position of the magnetic poles, and the rotating speed, of the rotating electric machine 50. That is, the computation control means 91 determines a switching element in the inverter section 40 which should be turned on, and the gate signal generation means 94 generates a gate signal in accordance with information from the determination. By so doing, the stator winding of the rotating electric machine 50 is short-circuited via a turned-on phase switching element and a free wheel diode of another phase, meaning that it is possible, using the method previously described in JP-A-11-75394, JP-A-2007-17026, or the like, to detect the rotating speed based on a period in which a short circuit current flows or on a time for which no short circuit current flows.

Also, when the direct current intermediate voltage is less than the specified value due to an interruption of the commercial power source 10 or the like (step S2 No), the computation control means 91 determines whether or not a time measured by the internal timer indicates that a first specified time $T_1$ has elapsed from when starting (step S4). If the specified time $T_1$ has elapsed (step S4 Yes), it is presumed that the direct current intermediate voltage has reached equal to or more than the specified value by a boost operation of the inverter section 40, to be described hereafter, in the specified time $T_1$, meaning that the step moves to the speed detection process (step S3).

If the specified time $T_1$ has not elapsed from when starting (step S4 No), the lower-arm switching elements (the switching elements connected to the negative side direct current terminal of the inverter section 40) 44, 45, and 46 of the U-phase arm 40*u*, V-phase arm 40*v*, and W-phase arm 40*w* of the inverter section 40 are all turned on (step S5). Further, after a second specified time $T_2$ shorter than the first specified time $T_1$ has elapsed (step S6), the switching elements 44, 45, and 46 are all turned off (step S7).

As energy accumulated in the inductance component of the rotating electric machine 50 is emitted into the capacitor 33 via the upper-arm free wheel diodes by the operation of intermittently turning on and off the switching elements in the way heretofore described, the capacitor 33 is charged. By so doing, it is possible to boost the direct current intermediate voltage.

Subsequently, after waiting for the specified time $T_2$ again (step S8), the direct current intermediate voltage and the current are detected by the voltage detector 81 and the current detector 82 (step S9). When the direct current intermediate voltage reaches equal to or more than the specified value by the boost operation in the steps S5 to S7 (step S10 Yes), the step moves to the speed detection process (step S3).

Also, when the detected direct current intermediate voltage is still less than the specified value (step S10 No), it is determined again whether or not the first specified time $T_1$ has elapsed from when starting (step S11). If the specified time $T_1$ has elapsed (step S11 Yes), it is presumed that the direct current intermediate voltage has reached equal to or more than the specified value by the boost operation in the steps S5 to S7, meaning that the step moves to the speed detection process (step S3).

If the specified time $T_1$ has not elapsed from when starting (step S11 No), the process in and after the step S1 is executed on condition that the current flowing through the rotating electric machine 50 is equal to or less than a specified value equivalent to an overcurrent (step S12 Yes), and when the direct current intermediate voltage exceeds the specified value (step S12 No), no more boost operation is carried out, and the process in and after the step S8 is repeatedly executed.

After the speed of the rotating electric machine 50 has been detected by executing this kind of speed detection process, the starting of the rotating electric machine 50 is carried out. By so doing, it is possible to accurately detect the speed of the rotating electric machine 50 and stably start the rotating electric machine 50 even when the direct current voltage of the inverter section 40 is lower than the induced voltage of the rotating electric machine 50.

In the preferred embodiment, the boost operation is carried out by simultaneously and intermittently turning on and off all the lower-arm switching elements 44, 45, and 46 of the three-phase inverter section 40, but all the upper-arm switching elements 41, 42, and 43 may be simultaneously and intermittently turned on and off. Alternatively, not only all the upper-arm or lower-arm switching elements, but at least one of the switching elements 41 to 46 configuring the inverter section 40 may be intermittently turned on and off.

Figure 4A:
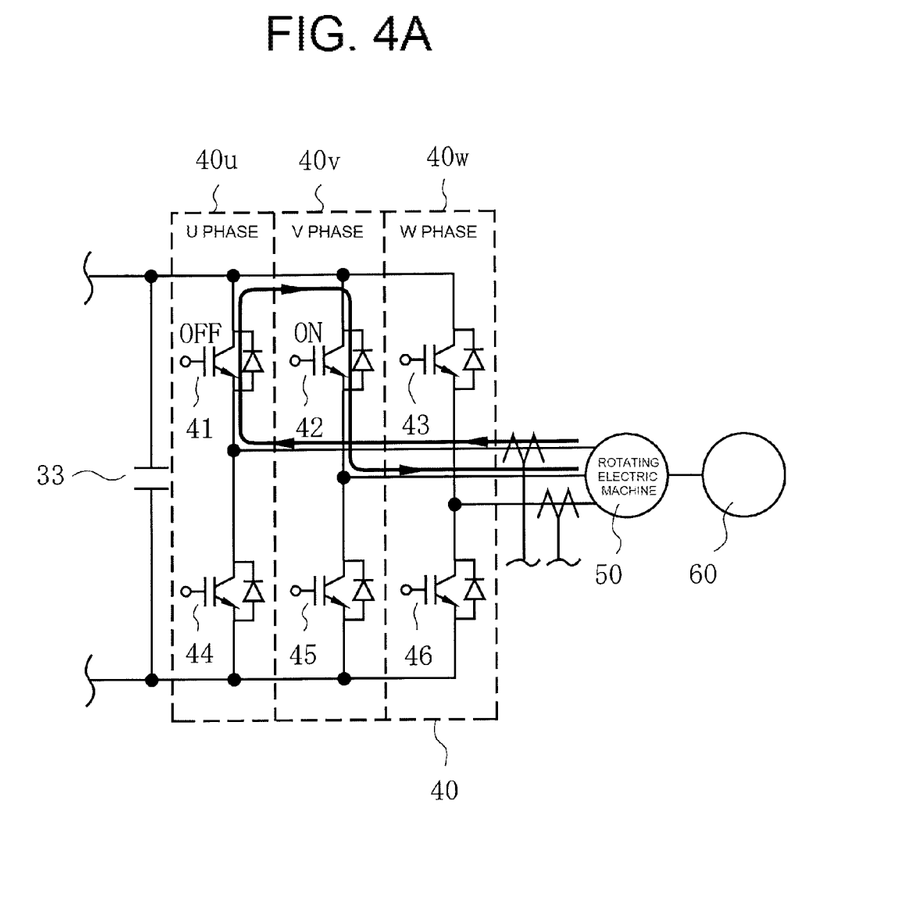
FIG. 4A and FIG. 4B illustrate operation when boosting by turning on and off an upper-arm switching element in the preferred embodiment of the invention.
Figure 4B:
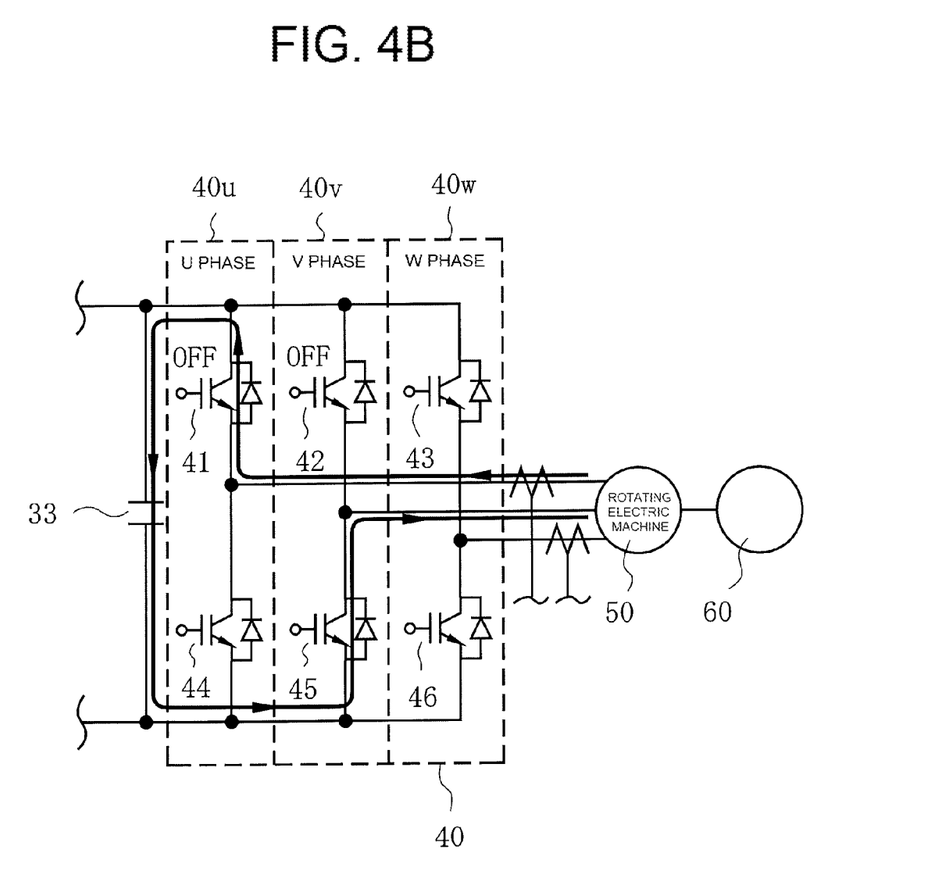

FIG. 4A and FIG. 4B illustrate operation when carrying out a boost operation by intermittently turning on and off, for example, only the V-phase upper-arm switching element 42. The other switching elements shall be turned off.

By turning on the switching element 42, as in FIG. 4A, as an operation equivalent to the step S5 of FIG. 3, a current flows via the free wheel diodes of the switching element 42 and U-phase switching element 41, and energy is accumulated in the inductance component of the rotating electric machine 50. Next, by turning off the switching element 42, as in FIG. 4B, as an operation equivalent to the step S7 of FIG. 3, the energy accumulated in the inductance component of the rotating electric machine 50 is emitted into the capacitor 33 via the free wheel diode of the switching element 41 and the free wheel diode of the V-phase lower-arm switching element 45, meaning that the capacitor 33 is charged. By so doing, it is possible to boost the direct current intermediate voltage in the same way as heretofore described.

Even when the inverter section and the rotating electric machine are not only of three phases, but of single phase, the boost operation of the capacitor 33 is possible by intermittently turning on and off at least one switching element, of the switching elements configuring the inverter section.

Also, in the preferred embodiment, a description has been given of a case in which the rotating electric machine 50 is a generator, but the invention can also be applied to the case of starting an electric motor in a condition in which the inverter section 40 stops operating and the electric motor acting as the rotating electric machine 50 runs idle.

In the embodiment of FIG. 1, a description has been given of the power conversion device including the converter section which converts the alternating current voltage of the commercial power source 10 to a direct current voltage. However, the invention can also be utilized as a self-contained power supply device which converts the alternating current output voltage of the generator, which is the rotating electric machine 50, to a direct current voltage with the inverter section 40 and supplies the direct current voltage across the capacitor 33 to an external load as a power source.

The invention is not limited to the aforementioned preferred embodiment but may be modified variously without departing from the scope and spirit of the invention.

The invention claimed is:

1. A power conversion device, comprising:
    a power conversion section including a plurality of bridge-connected semiconductor switching elements arranged in an upper arm and a lower arm for each of a plurality of phases, and including direct current voltage terminals and alternating current voltage terminals, the switching elements converting direct current power to output alternating current power when turned on and off;
    a plurality of free wheel diodes, one of the free wheel diodes being connected in reverse parallel with each semiconductor switching element in the power conversion section; and
    a rotating electric machine connected to the alternating current voltage terminals of the power conversion section,
    a capacitor connected between the direct current voltage terminals of the power conversion section,
    wherein when a voltage across the direct current voltage terminals is below a specified value when starting the rotating electric machine, a speed of the rotating electric machine is detected in a condition where the voltage across the direct current voltage terminals is boosted to at least the specified value by intermittently turning on and off at least one of the plurality of semiconductor switching elements,
    wherein boosting the voltage across the direct current voltage terminals to at least the specified value is carried out by simultaneously and intermittently turning on and off all the semiconductor switching elements in either the upper arms or the lower arms of the power conversion section.

2. The power conversion device according to claim 1, wherein the rotating electric machine is an alternating current generator and when the voltage across the direct current voltage terminals is lower than a terminal voltage of an alternating current generator driven by a drive source, a speed of the alternating current generator is detected in the condition in which the voltage across the direct current voltage terminals is boosted to equal to or higher than the terminal voltage by intermittently turning on and off at least one of the plurality of semiconductor switching elements.

3. The power conversion device according to claim 2, wherein the capacitor is connected between the direct current terminals of the power conversion section, a first power supply terminal is connected to a first end of the capacitor, and a second power supply terminal is connected to a second end of the capacitor, thus supplying a power source to an external load from the power supply terminals.

4. The power conversion device according to claim 1, wherein the rotating electric machine is an alternating current motor and when the voltage across the direct current voltage terminals is lower than the terminal voltage of the alternating current motor, a speed of the alternating current motor is detected in the condition in which the voltage across the direct current voltage terminals is boosted to equal to or higher than the terminal voltage by intermittently turning on and off at least one of the plurality of semiconductor switching elements.

5. The power conversion device according to claim 1, further comprising:
    a commercial power source; and
    an input converter section which converts input alternating current power of the commercial power source to the direct current power, wherein
    a positive output terminal of the input converter section is connected to a first end of the capacitor,
    a negative output terminal of the input converter section is connected to a second end of the capacitor, and
    the capacitor is connected between direct current terminals of the power conversion section.

6. The power conversion device according to claim 5, wherein a first power supply terminal is connected the first end of the capacitor, and a second power supply terminal is connected to a second end of the capacitor, thus supplying a power source to an external load from the first and second power supply terminals.

7. A power conversion device, comprising:
    a power conversion section including a plurality of bridge-connected semiconductor switching elements arranged in an upper arm and a lower arm for each of a plurality of phases, and including direct current voltage terminals and alternating current voltage terminals, the switching elements converting direct current power to output alternating current power when turned on and off; and
    a rotating electric machine connected to the alternating current voltage terminals of the power conversion section,
    a capacitor connected between the direct current voltage terminals of the power conversion section, wherein,
    when a voltage across the direct current voltage terminals is below a specified value when starting the rotating electric machine, a speed of the rotating electric machine is detected in a condition where the voltage across the direct current voltage terminals is boosted to at least the specified value by intermittently turning on and off at least one of the plurality of semiconductor switching elements, and
    when at least one of the switching elements is turned on, the rotating speed of the rotating electric machine is detected based on a period of conduction of a short circuit current flowing back through the at least one switching element and a stator winding of the rotating electric machine.

8. A method for controlling a power conversion device, comprising:
    turning on and off a plurality of bridge-connected semiconductor switching elements arranged in an upper arm and a lower arm for each of a plurality of phases, to convert direct current voltage across a capacitor to output alternating current voltage;
    driving a rotating electric machine with the alternating current voltage,
    wherein when the direct current voltage across the capacitor is below a specified value when starting the rotating electric machine, a speed of the rotating electric machine is detected in a condition where the direct current voltage is boosted to at least the specified value by intermittently turning on and off at least one of the plurality of semiconductor switching elements, wherein boosting the direct current voltage to at least the specified value is carried out by simultaneously and intermittently turning on and off all the semiconductor switching elements in either the upper arms or the lower arms of the power conversion section.

9. The method according to claim 8, wherein the rotating electric machine is an alternating current generator and when the direct current voltage is lower than a terminal voltage of an alternating current generator driven by the rotating electric machine, a speed of the alternating current generator is detected in a condition in which the direct current voltage is boosted to equal to or higher than the terminal voltage by intermittently turning on and off at least one of the plurality of semiconductor switching elements.

10. The method according to claim 9, further including:
charging the capacitor with the direct current power, and supplying power to an external load from the capacitor.

11. The method according to claim 8, wherein the rotating electric machine is an alternating current motor and when the direct current voltage is lower than a terminal voltage of the alternating current motor, a speed of the alternating current motor is detected in a condition in which the direct current voltage is boosted to at least the terminal voltage by intermittently turning on and off at least one of the plurality of semiconductor switching elements.

12. The method according to claim 8, further including:
converting input alternating current power from a commercial power source to direct current power, and charging the capacitor with the direct current power.

13. The method according to claim 12, further including supplying power from the capacitor to an external load.

14. A method for controlling a power conversion device, comprising:
turning on and off a plurality of bridge-connected semiconductor switching elements arranged in an upper arm and a lower arm for each of a plurality of phases, to convert direct current voltage across a capacitor to output alternating current voltage;
driving a rotating electric machine with the alternating current voltage, wherein
when the direct current voltage across the capacitor is below a specified value when starting the rotating electric machine, a speed of the rotating electric machine is detected in a condition where the direct current voltage is boosted to at least the specified value by intermittently turning on and off at least one of the plurality of semiconductor switching elements, and
when at least one of the switching elements is turned on, detecting the rotating speed of the rotating electric machine based on a period of conduction of a short circuit current flowing back through the at least one switching element and a stator winding of the rotating electric machine.

* * * * *